(12) United States Patent
Migdal et al.

(10) Patent No.: US 11,840,815 B2
(45) Date of Patent: *Dec. 12, 2023

(54) CIRCULAR DAM AND METHODS FOR GENERATING, ACCUMULATING, STORING, AND RELEASING ELECTRICAL ENERGY

(71) Applicants: Alexander Arkady Migdal, Princeton, NJ (US); Michael Pesin, Washington, DC (US); Dmitry Paperny, The Sea Ranch, CA (US)

(72) Inventors: Alexander Arkady Migdal, Princeton, NJ (US); Michael Pesin, Washington, DC (US); Dmitry Paperny, The Sea Ranch, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/988,228

(22) Filed: Nov. 16, 2022

(65) Prior Publication Data
US 2023/0085371 A1    Mar. 16, 2023

Related U.S. Application Data

(63) Continuation-in-part of application No. 17/942,021, filed on Sep. 9, 2022, now Pat. No. 11,639,590.
(Continued)

(51) Int. Cl.
*E02B 9/08* (2006.01)
*F03B 13/06* (2006.01)
(Continued)

(52) U.S. Cl.
CPC .............. *E02B 9/08* (2013.01); *E02B 9/02* (2013.01); *F03B 3/10* (2013.01); *F03B 13/06* (2013.01);
(Continued)

(58) Field of Classification Search
CPC .... E02B 9/00; E02B 9/08; F03B 13/06; F03B 13/12
(Continued)

(56) References Cited

U.S. PATENT DOCUMENTS 3,993,913 A * 11/1976 Dickman .................. E02B 9/08
290/53
4,569,200 A * 2/1986 Lamb ..................... F03B 13/268
405/76
(Continued)

FOREIGN PATENT DOCUMENTS

AU         2015326555 A1 *  3/2017  ............... E02B 7/02
CN         106223262 A    * 12/2016
(Continued)

*Primary Examiner* — Frederick L Lagman
(74) *Attorney, Agent, or Firm* — Boris Leschinsky

(57) ABSTRACT

A circular dam for generating, accumulating, storing, and releasing electrical energy comprises a wall defining a water reservoir built in an abundant body of water such as a sea or an ocean. Water inside the water reservoir is kept at a water level below the water level outside the wall so as to create a water level difference sufficient to operate one or more water turbines positioned across the wall of the water reservoir. Excess electrical energy from other renewable sources of electricity such as wind, solar power, or supplied by a local power grid is used to operate water turbines as water pumps to lower the water level inside the reservoir during times of peak supply of electricity. Water is drained from outside the wall back into the water reservoir to generate electrical energy by flowing over a plurality of water turbines. Generated electricity supplements electrical power for the local power grid during times of high demand.

17 Claims, 7 Drawing Sheets

Related U.S. Application Data

(60) Provisional application No. 63/297,462, filed on Jan. 7, 2022, provisional application No. 63/327,498, filed on Apr. 5, 2022, provisional application No. 63/391,534, filed on Jul. 22, 2022.

(51) Int. Cl.
    *F03B 13/12*     (2006.01)
    *F03B 3/10*     (2006.01)
    *F03B 15/06*     (2006.01)
    *E02B 9/02*     (2006.01)

(52) U.S. Cl.
    CPC ............. *F03B 13/12* (2013.01); *F03B 15/06* (2013.01); *F05B 2220/705* (2020.08); *F05B 2220/706* (2013.01); *F05B 2220/708* (2013.01); *F05B 2270/111* (2013.01); *F05B 2270/337* (2013.01); *F05B 2270/34* (2020.08); *F05B 2270/341* (2020.08)

(58) Field of Classification Search
    USPC ....................... 405/75, 76, 78, 210
    See application file for complete search history.

(56) References Cited

U.S. PATENT DOCUMENTS

| | | | |
|---|---|---|---|
| 6,967,413 B2 * | 11/2005 | Atiya ..................... | F03B 13/26 290/43 |
| 8,128,318 B1 * | 3/2012 | Anderson, Jr. ....... | F03B 13/264 60/498 |
| 9,261,068 B2 * | 2/2016 | Barakat ................... | F03B 13/00 |
| 9,741,883 B2 * | 8/2017 | Haarburger ........... | B65D 88/34 |
| 10,097,131 B2 * | 10/2018 | Momayez ............... | H02S 10/40 |
| 10,359,027 B2 * | 7/2019 | Barakat ................... | F03B 13/08 |
| 11,639,590 B2 * | 5/2023 | Migdal .................... | E02B 9/08 405/76 |
| 2001/0028825 A1 * | 10/2001 | Kinno ................... | F03B 13/268 405/76 |
| 2002/0114670 A1 * | 8/2002 | Kinno ...................... | E02B 3/04 405/75 |
| 2004/0022584 A1 * | 2/2004 | Sherman ................. | E02D 17/18 405/303 |
| 2012/0237298 A1 * | 9/2012 | Cook ........................ | E02B 9/08 405/76 |
| 2013/0266378 A1 * | 10/2013 | French, Sr. ............. | E02B 9/00 405/116 |
| 2014/0197640 A1 * | 7/2014 | Barakat ................... | F03B 13/08 290/54 |
| 2014/0290721 A1 * | 10/2014 | Haarburger ......... | H01L 31/0445 136/251 |
| 2016/0059938 A1 | 3/2016 | Momayez et al. | |
| 2017/0204738 A1 * | 7/2017 | Barakat ................... | F03B 13/08 |

FOREIGN PATENT DOCUMENTS

| | | | | |
|---|---|---|---|---|
| DK | 201370267 A | * | 3/2014 | ............... E02B 7/02 |
| EP | 2 345 809 | | 7/2011 | |
| KR | 100834184 | | 5/2008 | |
| WO | 2013044978 | | 4/2013 | |
| WO | WO-2013044977 A1 | * | 4/2013 | ............... E02B 3/10 |

\* cited by examiner

| Wall Radius km | 0.50 | 0.75 | 1.00 | 1.50 | 2.00 | 2.50 | 3.00 |
|---|---|---|---|---|---|---|---|
| Wall Cost M$ | 374 | 561 | 748 | 1,122 | 1,495 | 1,869 | 2,243 |
| Wall Height m | 25 | 25 | 25 | 25 | 25 | 25 | 25 |
| Energy kWh | 668,816 | 1,504,835 | 2,675,262 | 6,019,341 | 10,701,050 | 16,720,391 | 24,077,362 |
| Power 10 hrs kW | 66,882 | 150,484 | 267,526 | 601,934 | 1,070,105 | 1,672,039 | 2,407,736 |
| Gen cost M$ | 30 | 68 | 120 | 271 | 482 | 752 | 1,083 |
| Total Cost M$ | 404 | 628 | 868 | 1,392 | 1,977 | 2,622 | 3,327 |
| CAPEX $/kWh | 604 | 418 | 324 | 231 | 185 | 157 | 138 |
| CAPEX $/kW | 6,040 | 4,176 | 3,245 | 2,313 | 1,847 | 1,568 | 1,382 |
| LCOS $/kWh | 0.182 | 0.129 | 0.103 | 0.076 | 0.063 | 0.055 | 0.050 |

Fig. 7

CIRCULAR DAM AND METHODS FOR GENERATING, ACCUMULATING, STORING, AND RELEASING ELECTRICAL ENERGY

CROSS-REFERENCE DATA

This patent application is a continuation-in-part of the U.S. patent application Ser. No. 17/942,021 filed on 9 Sep. 2022 by the same inventors and entitled METHODS AND WATER RESERVOIR SYSTEMS FOR GENERATING, ACCUMULATING, STORING, AND RELEASING ELECTRICAL ENERGY, now U.S. Pat. No. 11,639,590, which in turn claims a priority date benefit from the co-pending U.S. Provisional Patent Application No. 63/297,462 filed 7 Jan. 2022 entitled "Dual-use systems and methods for renewable power generation and protection against rising sea levels", U.S. Provisional Patent Application No. 63/327,498 filed 5 Apr. 2022 entitled "Methods and water reservoir systems for accumulating, storing, and releasing electrical energy", and U.S. Provisional Patent Application No. 63/391,534 filed 22 Jul. 2022 with the same title; all of these patent documents are incorporated herein in their respective entireties by reference.

BACKGROUND

Without limiting the scope of the invention, its background is described in connection with water dams and water reservoirs, as well as systems configured for generating, accumulating, storing, and releasing electrical energy. More particularly, the invention describes an artificially built circular dam surrounding a water reservoir having a water level below that outside the circular dam, the circular dam is built in a large body of water with external walls extending to or just above a high tide water level. Water removed from the interior water reservoir encircled by the circular dam creates a void and, therefore, a height differential between a higher outside water level and a lower inside water level. Outside water may be released to drain inside the circular dam by flowing through electricity-generating turbines so as to convert the potential energy of a water column to electrical energy, which can then be directed to satisfy the demands of the electrical grid. Removal of the water from within the circular dam may be done by using the same or other water turbines operated by excess electricity generated at peak winds by nearby wind turbines and/or peak electricity generated by solar panels, or by other electricity generating methods.

Renewable sources of electrical energy are getting more and more popular as an alternative to traditional methods and systems to produce electricity. Solar, wind, and tidal wave power plants of various sizes and capacities are being implemented in various countries and this trend is expected to continue and expand over at least the next decade or more. The growth of renewable energy sources in the global production of electricity is accelerating. Renewable energy capacity, excluding large hydropower plants, increased worldwide by an unparalleled 184 GW in 2019. This was 20 GW more than in 2018. It is worth mentioning that the global capacity in renewable power was 414 GW in 2009, and only ten years later it was around 1627 GW, i.e., it grew more than 3.9 times. Experts further predict that the share of renewable energy sources in the global electrical power generation industry can grow from 15% in 2015 to 63% in 2050. Using wind power as an example, as much as 60 GW of wind energy capacity was installed and placed in service globally in 2019, an increase of 19% as compared to the previous year.

One critical limitation of electricity generation using most types of renewable energy systems is fluctuating nature of produced power wind power generators depend on the direction and strength of the wind; solar panels are dependent on the availability of direct sunshine, tidal wave power plants depend on the times of high and low tides for their operation. Once produced, electrical energy needs to be consumed right away or stored in some highly efficient form suitable for easy retrieval at a later time. Fluctuating energy voltage and frequency variations put additional stress on electric power grid, endangering the power grid operation.

Uneven energy production is only one part of the problem. Varying electricity demand also makes it difficult for power producers to accurately predict and satisfy the energy demands of their customers. In addition to daily, weekly, and monthly fluctuations in power demand levels, seasonal and global fluctuations play a significant role in defining how much energy is needed at a certain time and day.

Balancing fluctuating demand and fluctuating and at times uncertain supply of electricity is not a simple task. Overproduction of electricity, for example, causes significant difficulties with efficient energy storage. Conventional batteries are not very efficient for coping with substantial power production spikes and are not economic for storing more than 2-4 hours of energy. The need exists for more economical, longer duration (10+ hours), and ecologically friendly methods of storing electrical energy when it is overproduced and releasing this electrical energy to satisfy peak market demands when needed.

Previous attempts to use existing hydroelectric plants are known in the art. During a time of low demand, excess electricity may be used to pump water from low levels back to high levels so it can be used to generate more electricity when needed. These systems have a major limitation of only being available at locations where hydroelectric plants are located, usually in places of high elevations or mountains. For relatively flat locations, which are predominant around the world, these methods of storing energy are not suitable. In addition, renewable wind and solar energy sources are typically deployed in flat areas, such as along a coastline next to a sea or an ocean, and so they may be located far away from existing hydroelectrical plants.

Other known methods used for the storage of produced electricity include electrochemical batteries, flywheel energy storage systems, supercapacitors, and compressed air plants. These technologies did not find widespread use because of their costs, difficulty with deployment on a large scale, environmental risks, and low energy conversion efficacy.

The need, therefore, exists for an efficient and ecologically friendly solution to the problem of balancing the unpredictable production of electrical energy from wind and solar power plants against the varying energy demands of modern cities, especially those located in flat areas along the coastal line.

SUMMARY

Accordingly, it is an object of the present invention to overcome these and other drawbacks of the prior art by providing a novel circular dam configured for generating, accumulating, storing, and releasing electrical energy—to act independently or as a component of the electrical power grid designed to smooth over peak energy supply as well as peak energy demand.

It is another object of the present invention to provide a novel circular dam designed to be built in an abundant body of water and allow accumulating, storing, and releasing of electrical energy.

It is a further object of the present invention to provide a circular dam configured for smoothing over the peaks of energy supply and demand using readily available components and in an environmentally conscious and safe manner.

It is yet a further object of the present invention to provide a method of reducing electrical energy peaks in supply and demand and therefore promote the global use of renewable power sources, in particular, using wind and solar power to generate electricity.

It is yet another object of the present invention to supplement accumulating, storing, and releasing electrical energy by generating additional electrical energy using the facilities of the novel circular dam.

A circular dam for accumulating, storing, and releasing electrical energy, according to the present invention, may include a continuous wall encircling and therefore defining the boundaries of a water reservoir within thereof. The wall may be built in an abundant body of water to extend from a bottom thereof to or above a water level. In case the water level varies in the abundant body of water, such as during high tides and low tides, the term "water level in the abundant body of water" is used to mean the water level at high tide.

The wall may therefore be configured to contain water within the water reservoir at a certain water level. The key innovative feature of the present invention is that the water level inside the water reservoir may be kept at a level below the water level of the abundant body of water, thereby creating a height difference between the higher level of water outside the wall and the lower level of water inside thereof. This difference creates a potential energy reserve, which can be used when the water from outside the wall is allowed to drain into the water reservoir.

The circular dam may further feature a plurality of reversible water turbines operably associated with corresponding electrical motors/generators. The water turbines may be configured to direct water across the wall between the water reservoir and the abundant body of water outside thereof. The water turbines may be further configured to operate in one of two modes of operation: an energy generating mode or a water pumping mode.

The energy generating mode may be aimed to produce electrical energy by electrical motors/generators when the water turbines are driven or urged to rotate by water draining therethrough from the higher water level in abundant body of water into the water reservoir.

The water pumping mode is a reverse of this operation aimed to pump water from the lower level of water in the water reservoir to the higher level of water in the abundant body of water. In this mode, the water turbines may be driven by electrical motors/generators. Advantageously, this mode may be activated to use up excess electrical energy supplied from the power grid to energize the electrical motors/generators to cause the water turbines to operate in a water pumping capacity.

The circular dam may further include a computerized controller connected to electrical motors/generators and to the electrical power grid and configured to cause: (i) accumulating energy by emptying the water reservoir using excess electrical energy from the electrical power grid to operate electrical motors/generators of the water turbines, or (ii) releasing energy by draining the water from the abundant body of water into the water reservoir to cause electrical motors/generators to generate electrical energy when rotated by water turbines and supply thereof to the electrical power grid.

Using the circular dam in this manner may be beneficial for reducing fluctuations in peak electrical energy supply and peak electrical energy demand of the electrical power grid.

Supplemental electrical energy may be generated while using the circular dam by utilizing a plurality of floating solar panels, partially or completely covering the interior water level of the water reservoir and configured to accommodate fluctuations in the water level inside the water reservoir depending on the present volume of water inside thereof.

The circular dam of the invention may be constructed near a wind turbines farm, containing one or more wind turbines, such as offshore wind turbines farms. Before supplying electrical energy generated by the wind turbines farm to the power grid, it may be advantageous to direct some or all of the generated electricity to operate the circular dam in order to smooth out the supply of electricity directed afterward to the use by electrical grid customers.

A novel method of reducing peak electrical energy supply and peak electrical energy demand for an electrical power grid may include the steps of providing the circular dam of the invention, and operating thereof to either:

accumulate energy by pumping the water from the water reservoir across the wall to the abundant body of water using excess electrical energy during peak electrical energy supply of the electrical power grid to operate electrical motors/generators of the water turbines, or release electrical energy during peak energy demand of the electrical power grid by draining the water from the abundant body of water into the water reservoir to cause electrical motors/generators to generate electrical energy and supply thereof to the electrical power grid.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through the use of the accompanying drawings, in which:

FIG. 7 shows calculated examples of various parameters for the circular dam.

DETAILED DESCRIPTION OF PREFERRED EMBODIMENTS OF THE INVENTION

Figure 1:
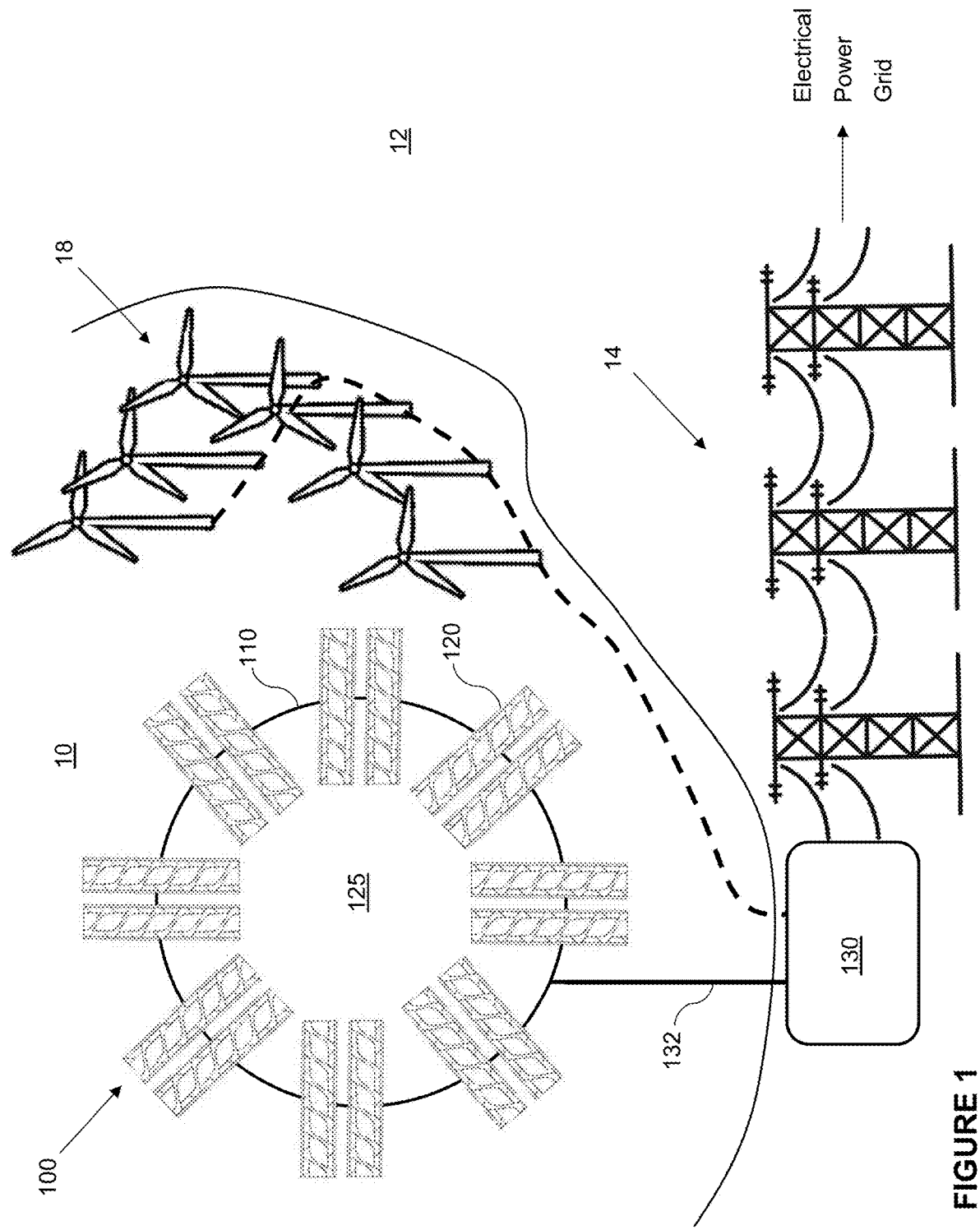
FIG. 1 is a schematic view of the main components of the novel circular dam of the invention.

The following description sets forth various examples along with specific details to provide a thorough understanding of claimed subject matter. It will be understood by those skilled in the art, however, that claimed subject matter may be practiced without one or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Various embodiments of the present invention are illustrated generally in FIGS. 1 through 6. FIG. 1 shows schematically a diagram of the top view of the main components of the invention. The first novel step in the building of the circular dam 100 is a selection of an appropriate location. The present invention teaches to position the circular dam at the water level of suitable height associated with an abundant body of water 10. The term "abundant body of water" is used to define a large body of water with easy access to sufficient water volume so as to fill the water reservoir 125 of the invention—all without appreciably changing the water level of the abundant body of water. The abundant body of water may be defined as holding at least 10 times, at least 50 times, at least 100 times, or more water than that needed to fill the water reservoir 125 to the maximum water level. A large lake, a sea, or an ocean are all examples of a suitable abundant body of water.

The circular dam 100 may be entirely located within the abundant body of water 10. In other embodiments, the water reservoir wall 110 may be partially located within the abundant body of water 10. In further embodiments, the water reservoir system 100 may be located close to an abundant body of water 10 and comprise a suitably large water pipe system to connect the components thereof and the abundant body of water, so as to provide a low-resistance flow of water in and out of the water reservoir system 100 and the abundant body of water 10. Therefore, for the purposes of this description, the term "a circular dam comprising a continuous wall defining a water reservoir within thereof, the wall is built in an abundant body of water and extending from a bottom thereof to or above a water level of the abundant body of water" is used to mean a variety of situations where the water reservoir 125 is located within or nearby the abundant body of water, such as within a distance of up to 500 feet from the shore so as to have easy access to the abundant body of water allowing practical movement of large volumes of water between the water reservoir 125 and the abundant body of water 10.

As already evident from the above discussion, the water reservoir system 100 may be built at or close to sea level so as to assure ease of flowing of large volumes of water in and out of the water reservoir. When used with large lakes, the water reservoir system 100 may be built at or near the water level in the lake for similar reasons.

As one of the main objectives of the invention is to smooth out peak power fluctuations in an electrical power grid, another consideration for the location of the water reservoir system 100 of the present invention is to be situated with suitable access to the electrical power grid. FIG. 1 shows schematically the presence of the electrical power line 14 leading to the electrical power grid.

A critical component of the water reservoir system 100 is a computerized controller 130 configured to have electrical communication 132 with all components of the water reservoir system 100 as well as an electrical connection to the electrical power grid. The computerized controller 130 may also be connected to one or more wind turbines 18, located on or offshore. The computerized controller 130 may be configured to be used with a separate controller operating the wind turbines 18 or may be configured as a combined control center to operate both the circular dam 100 and the nearby single or a plurality of wind turbines 18. The controller can receive signals from the electric grid operator and adjust the electricity output or adjust the electricity consumption for energy storage in accordance with the grid's operational needs in real-time. The controller is capable to act based on sensing local electrical parameters and on a signal received from a utility company or a grid operator. In addition to supplying electric energy at the time and in the amount required, the system is capable of providing other ancillary services necessary for reliable, resilient, and economic electric grid operations.

In addition, the computerized controller 130 may be equipped with various sensors required to monitor the operation of the circular dam 100 as well as, optionally, the level of electrical power in the electrical power grid. In some embodiments, the computerized controller 130 may be equipped with one or more sensors indicating the level of water inside water reservoir 125, and outside the water reservoir 125, as well as the electrical activity of all major components of the system of the present invention. The computerized controller 130 may be further equipped to receive signals from the electrical power grid indicating the level of the electrical energy supply and demand therein, for example, to receive a call for using excess electrical energy to pump water into the water reservoir, or a signal to release electrical energy to supplement electrical energy available in the power grid from other sources when the demand level for electrical power is high.

FIG. 1 also shows an exemplary wall 110 erected within the abundant body of water 10 close to the shoreline of the shore area 12. Reservoir wall 110 may be built on the bottom of the body of water 10 and extend to a height equal to or slightly exceeding the normal water level of the body of water 10. As the water level inside the water reservoir 125 is expected to be below the water level outside the wall 110, a small safety margin may be required to prevent the water from overflowing over the wall 110 into the reservoir 125. The safety margin for the wall height above the water level outside the wall may be selected to be 1 meter or less, 2 meters or less, 3 meters or less, or another height depending on the expected height of waves in a particular location. The wall height may be selected to be sufficiently high to allow separation of the water inside the water reservoir 125 from the water outside the wall 110, thereby providing conditions for accumulation and storage of the water inside the water reservoir 125 at a water level below the water level in the surrounding waters of the abundant body of water 10.

One of the advantages of the present invention is its safety in operation. Importantly, most of the wall body is located under the water level of the abundant body of water and therefore is not subjected to periodic impact stresses of the incoming water waves. In addition, even in case of a catastrophic rise in water level (such as with a tsunami), the worst consequence would be filling the water reservoir 125 with undesired water from outside the wall causing a one-time loss of some electrical generation potential—all without impacting the safety and operational capability of the circular dam itself.

The shape of the wall 110 may be circular, oval, polygon-shaped, or any other suitable continuous shape according to the local conditions. In that sense, the term "circular dam" is not limited to only the shape of a geometrical circle, as is evident from the following discussion as well as exemplary illustrations describe below. The main requirement for the shape of the wall 110 is to be continuous and define a water reservoir within thereof, thereby allowing to create and maintain a lower water level inside the wall as compared to the water level outside the wall 110.

Figure 3:
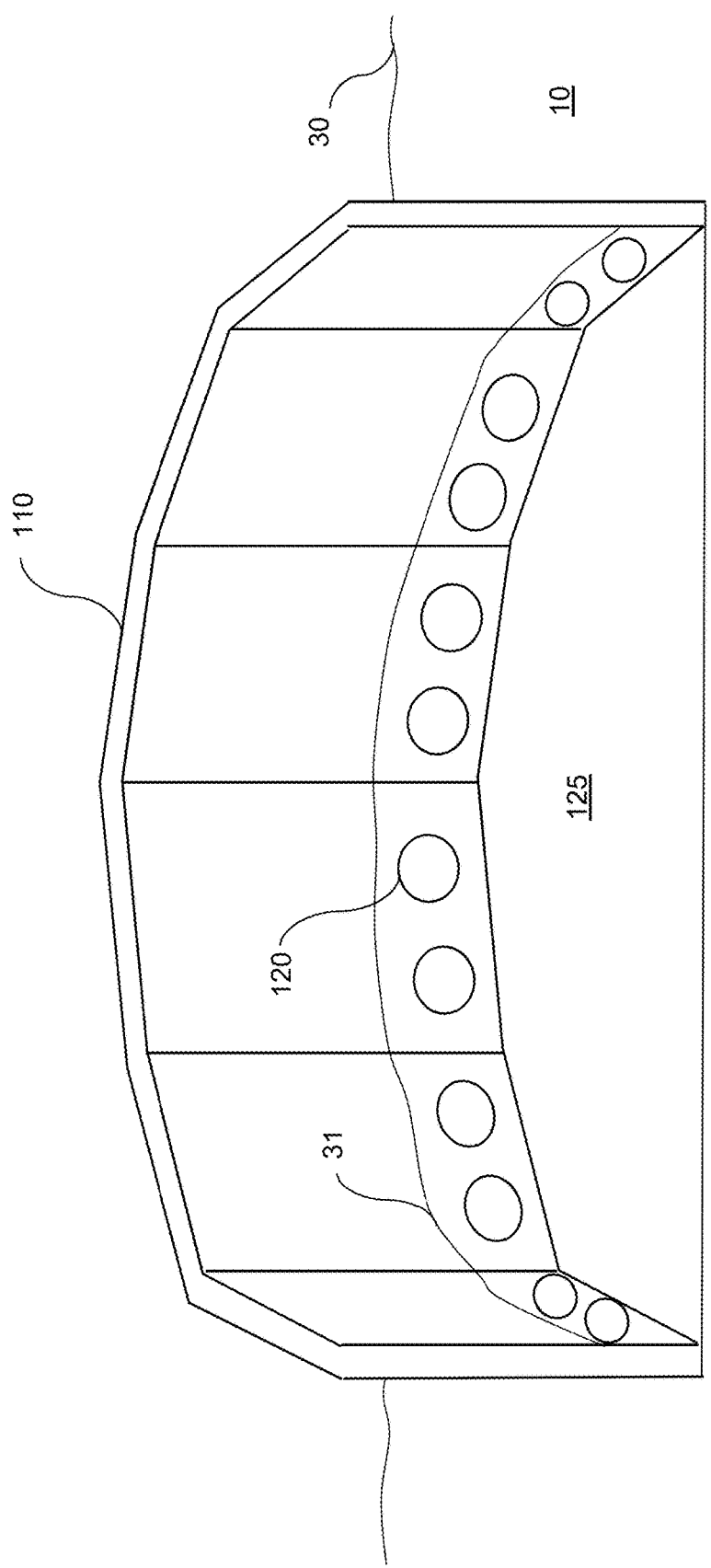
FIG. 3 is a general cut-off perspective view of the same.
Figure 4:
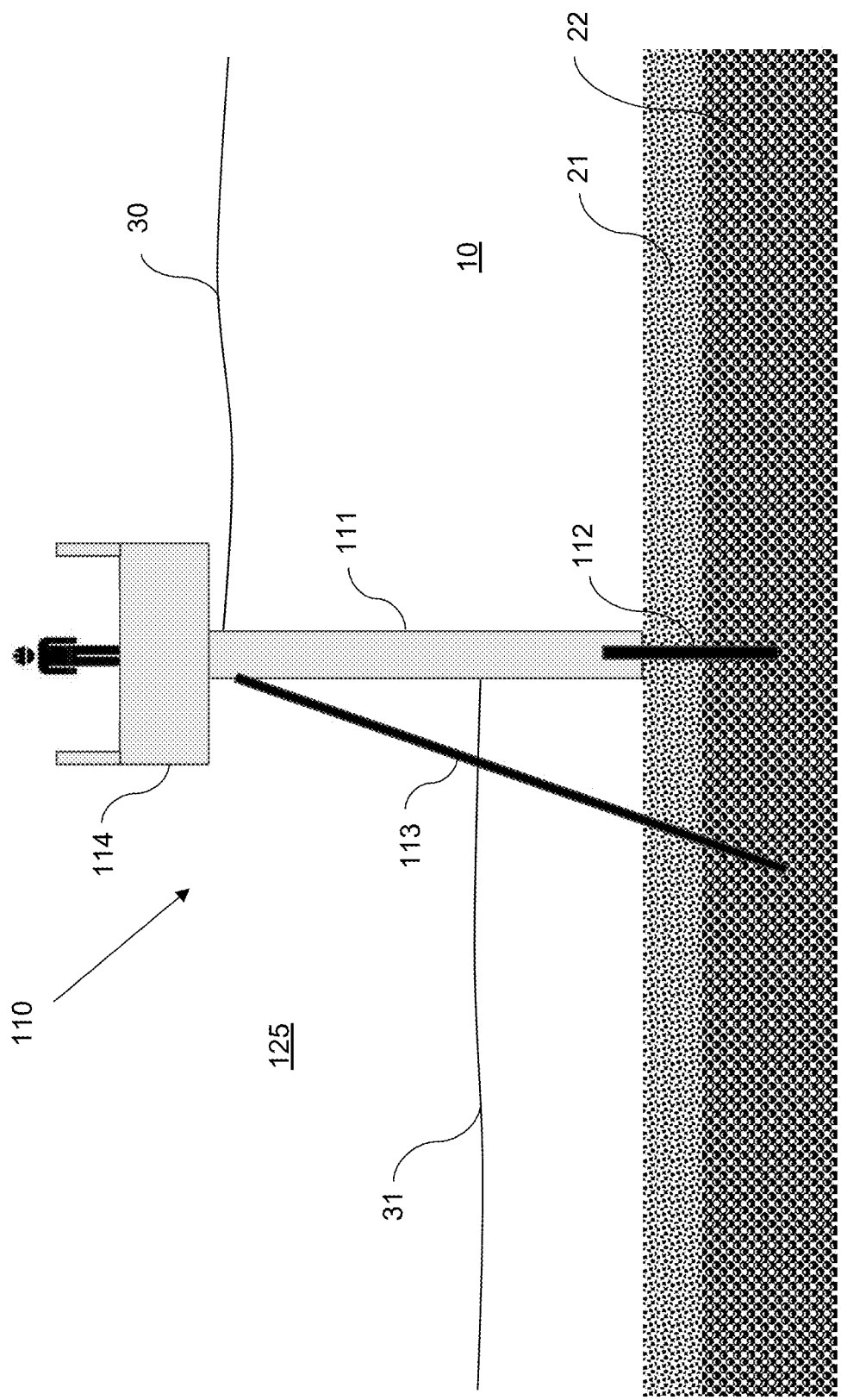
FIG. 4 is a cross-sectional view of a first alternative wall design for a circular dam.

The wall 110 may be constructed using reinforced concrete or other suitable materials. A conventional rectangular shape may be used for a cross-section of the wall 110 as seen in FIG. 3. Alternatively, the wall 110 may have a main portion of the wall 111 positioned on the bottom of the abundant body of water 21, with an optional spike 112 extending to the bedrock layer 22. The main portion 11 may be supported by a series of inclined supports 113 positioned inside the water reservoir 125, as seen in FIG. 4. The inclined supports may also extend through the bottom layer 21 to reach the bedrock 22 if needed. The advantage of the design is a possibility to reduce the thickness of the main portion of the wall 111, leading to a reduction in the volume of cement needed for its safe operation, and resulting in reduced construction costs.

Figure 5:
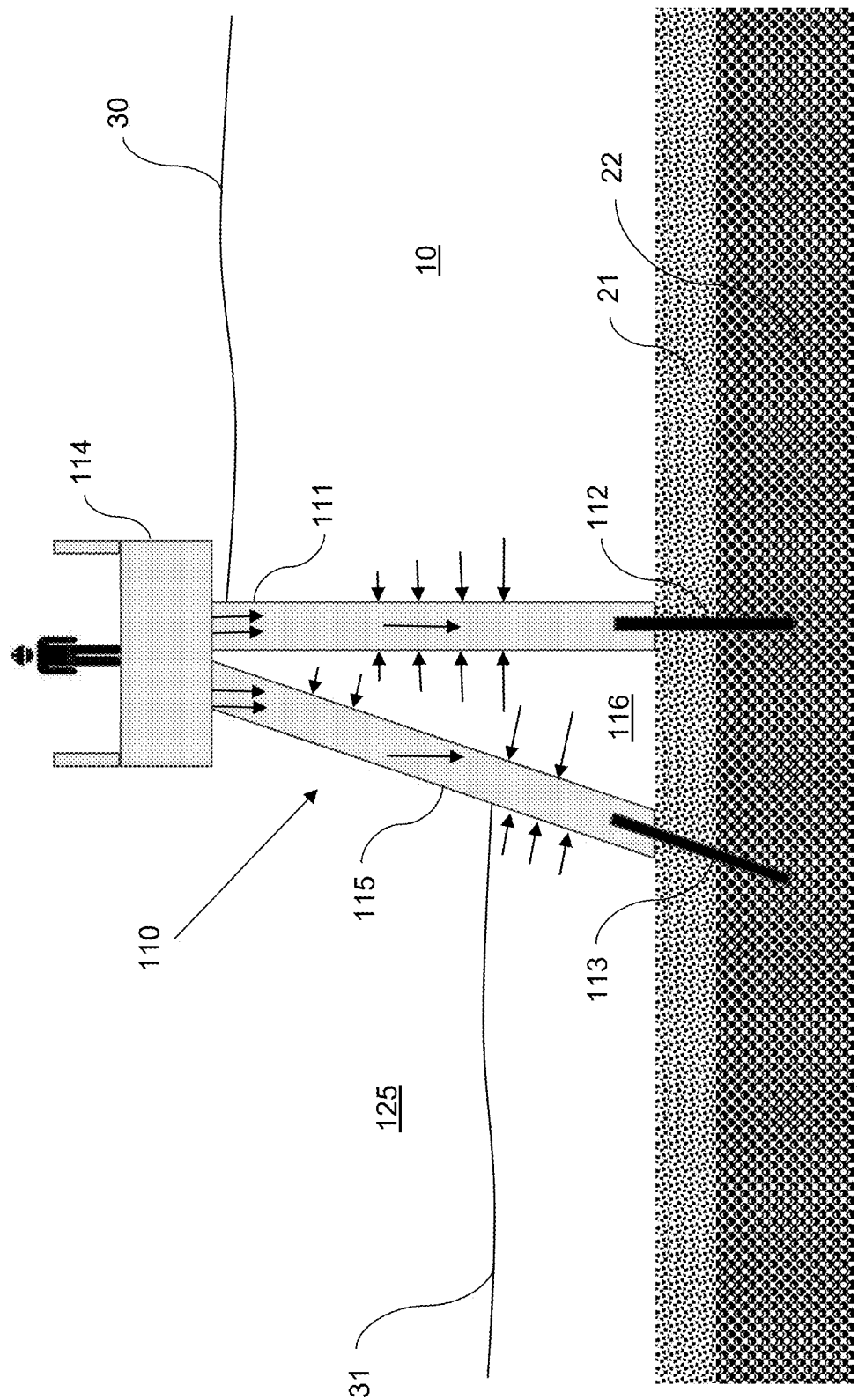
FIG. 5 is a cross-sectional view of a second alternative wall design thereof.

FIG. 5 shows a further alternative design of the wall 110, consisting of the main portion 111, supported from the interior area of the water reservoir 125 by an inclined wall 115. Bothe the main portion of the wall 111 and the inclined wall 115 may be extended to reach the bedrock layer 22 by corresponding spikes 112 and 113 if needed. The space 116 between the vertical wall 111 and the inclined wall 115 may be filled with water so as to reduce the outside pressure on the main wall 111 as shown in FIG. 5 by arrows.

The bottom layer 21 of the body of water 10 located within the boundaries of the water reservoir 125 needs to have sufficiently low water permeability so as to not allow water to passively drain into the water reservoir 125 from the outside body of water 10, which may be caused by a difference in water levels inside and outside the water reservoir 125. In the case of sandy sediment covering the bottom of the water reservoir 125, there may not be a need to take any measures to seal the bottom. Water seepage through the bottom of the reservoir is governed by the Darcy law. With an exemplary radius of the water reservoir 125 at one or several kilometers, the size of the grain of sand of about 1-2 mm, and the depth of sediment at about 100 meters, calculations show that the rate of leakage would not exceed about 1% of the volume of the water reservoir per day, making additional sealing efforts unnecessary.

One or more reversible water turbines 120 may be positioned across the wall 110 to direct water in and out of the water reservoir 125. Any suitable designs may be used for this purpose, for example, axial flow water turbines. Each turbine 120 may be equipped with or otherwise associated with an electrical motor/generator. When the motor is powered up with electrical power, the water turbine 120 may act as a water pump to pump water from the water reservoir 125 to the abundant body of water 10. In reversed conditions, when the water is drained from the abundant body of water 10 into the water reservoir 125 through the water turbines 120 (based on a higher water level outside the wall 110 as compared to the lower water level inside thereof), the water turbines 120 may be configured to be rotated by the water and cause the motor/generators to generate electrical power, which can be directed to supplement the electrical power in the electrical power grid.

In some embodiments, water turbines 120 may be placed directly across the wall 110 at a level at or lower than the minimal water level inside the water reservoir 125. A plurality of such water turbines 120 may be located throughout the periphery of the circular dam wall 110 as seen in FIG. 1.

Figure 2:
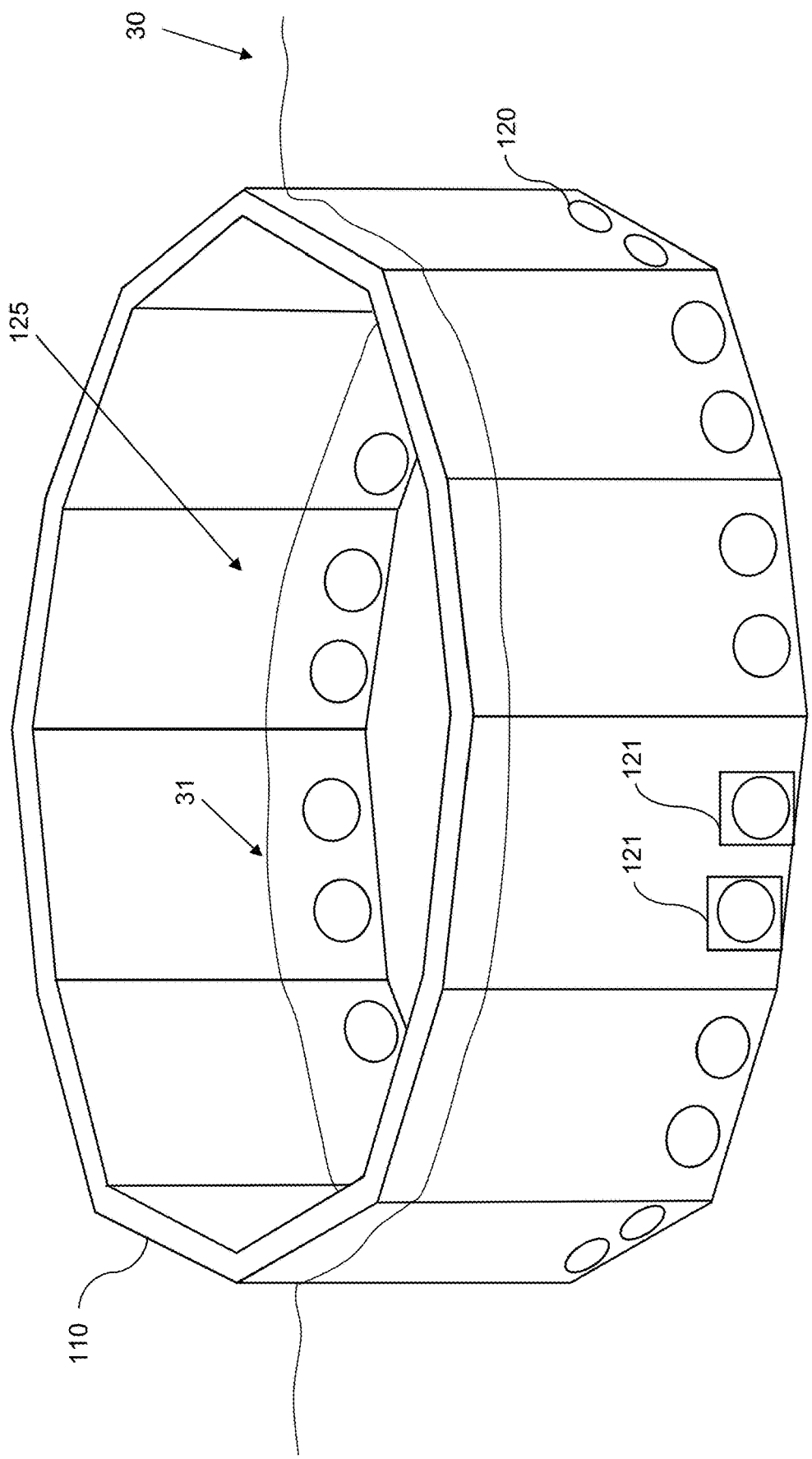
FIG. 2 is a general perspective view of the circular dam of the invention.

A general perspective view of the circular dam 100 is seen in FIG. 2 and FIG. 3. The dam wall 110 may be erected in a shape of a circle or, as seen in FIG. 2, in a shape of a polygon with multiple section forming the wall 110. Generally speaking, the shape of the water reservoir 125 close to that of a circle may be preferable as it encloses the most inner area for a minimal length of the wall, therefore minimizing construction costs. As constructing straight walls is more economical than curved walls, a form of a polygon may offer the advantage of surrounding the most area for the lowest cost of construction. Individual sections of the polygon may not be of even length so as to accommodate local conditions, as may be understood by those skilled in the art.

The wall 110 may be built in a relatively shallow and flat area of the body of water 10 and close to the shore, such as a bay area for example. Building the wall 110 exposed at least along a portion thereof to ocean water and on top of a reasonably flat seafloor is advantageous as there will be required only minimal preparation work on the floor of the water reservoir 125 (such as smoothing uneven surfaces) so the cost of construction of the entire system is dictated primarily by the linear (per kilometer) cost of the wall, in addition to all equipment.

Location of the water reservoir 125 may be selected to account for water level during low tide and high tide if the water reservoir 125 is constructed at the sea or the ocean. The wall 110 may be constructed to exceed the high tide level 30 by a predetermined safety margin as discussed above. The depth of the water reservoir, defined as the difference between the water level 30 outside the wall 110 and the minimal water level 31 inside the water reservoir (selected to fully cover the entry points of all water turbines 120), may be selected to be sufficiently large so as to allow efficient operation of the circular dam 100. In embodiments, the depth of the water reservoir 125 may be at least 1 m, at least 2 m, at least 3 m, at least 4 m, at least 5 m, at least 6 m, at least 7 m, at least 8 m, at least 9 m, at least 10 m, at least 15 m, at least 20 m, at least 25 m, at least 30 m, at least 40 m, or even greater depending on other factors, as the invention is not limited in this regard.

The maximum level of water 31 inside the water reservoir 125 may be designed to be at or near the water level of the abundant body of water. In certain circumstances, spillover protection may be necessary to avoid uncontrolled excessive dumping of water into the water reservoir in case of equipment malfunction. To assure safety, the circular dam 100 may include one or more spill gates, which may be opened or closed by the computerized controller 130. These spill gates are intended to be closed all the time, except in emergency conditions, such as an upcoming hurricane or an unavoidable collision with a large ship, which may cause a breach in the wall, or for maintenance purposes. A safe and rapid increase in water level 31 to that close to or at the level 30 outside the wall by dumping water into the water reservoir 125 may be used to avoid abrupt and uncontrolled spillage of large volumes of water in case of an unanticipated event that poses a risk of a wall breach.

One, two, or a plurality of water turbines such as reversible water turbines 120 may be positioned to direct the flow of water across the wall 110. The water reservoir system 100 may include more than one turbine 120, such as at least 5, at least 10, at least 20, at least 30, at least 40, at least 50, at least 75, at least 100, or even more of the water turbines, as the invention is not limited in this regard. In some embodiments, water turbines 120 may be positioned directly across the wall 110 and below the water level 30 of the body of water 10. In other embodiments, the water turbines 120 may be positioned inside the water reservoir or outside thereof and provided with a water pipe to expose one side thereof to the water inside the water reservoir 125 and the other side thereof to the water outside thereof, depending on local conditions and preferences. In further yet embodiments, the water turbine 120 may be positioned at or even above the water level 30 and be equipped with a water-filled conduit to connect the water turbine to water on both sides of the wall 110, as the invention is not limited in this regard. Suitable screens may be installed at the outlet of water turbines 120 to avoid local fish and other living organisms or other objects from being sucked into the turbines when operating in a power-generating mode.

Each water turbine 120 may be equipped with an electrical motor/generator, which operates either as a motor or a generator depending on the mode of operation of the water turbine. When the water turbine 120 is used as a water pump, the motor is operated by supplied electrical power, and the water turbine is rotated in a manner to direct water to lower the water level inside the water reservoir 125. When the water is drained into the water reservoir, the water turbine 120 may be used in reverse, namely to be driven by the water flow and to rotate the shaft of the motor/generator to cause the generation of electrical energy.

Water flowing into and out of the water turbines 120 may be controlled by at least one electrically operated sluice 121, which may be located either at the entrance of the water flow into the water turbine or at its exit. More than one sluice may be used, for example, to completely isolate the water turbine from operation at both the entrance and the exit of the water flow—such as to allow a repair or maintenance to be performed from time to time.

Various materials may be used for the construction of wall 110, as known by those skilled in the art. In some embodiments, the entirety of wall 110 may be made from the same materials, while in other embodiments, wall 110 may be constructed by connecting existing sections and repurposed structures as may be available with intermediate portions of the wall made from various available local materials. Importantly, the structural integrity of wall 110 must be sufficient to hold the water inside the reservoir at a desired depth below the water level outside the reservoir.

The top edge of the wall 110 may be enlarged and converted to be a boardwalk, a path for walking or bicycling along thereof, a road for vehicles such as technical service vehicles, or for another useful recreational activity. Trees may be placed along the wall 110 to further improve the appearance of the water reservoir system 100 as a stand-alone island.

In operation, the circular dam 100 may be used in an energy-generating mode or a water-pumping mode. The computerized controller 130 may be configured to select the mode of operation depending on the balance of the electrical energy supply and demand in the electrical power grid. In particular, the computerized controller 130 may detect the condition or receive a first signal from the electrical power grid indicating that the electrical energy supply is exceeding the demand for such energy and that excess electrical power is available and in need of accumulating and storing until the demand for electrical energy increases. Alternatively, the computerized controller 130 may be able to receive the signal or detect the condition of the electrical power grid when the electrical energy in the electrical power grid is exceeding a predetermined peak supply threshold. In either one of these cases, the computerized controller 130 may be configured to initiate the operation of the circular dam 100 of the invention in the water pumping mode.

The objective of operating the circular dam 100 of the invention in the water pumping mode is to utilize an excess of electrical power to pump water out of the water reservoir, assuming that the current water level 31 at that point is above the minimum safe level. If this is the case, the computerized controller 130 may activate one, two, or more of the available water turbines to start pumping water from the water reservoir 125 into the surrounding abundant body of water 10 with the aim of decreasing the water level in the water reservoir 125. The excess electrical power may be directed from the electrical power grid or from nearby wind turbines 18 to operate the motors/generators of any suitable number (from one to all) of the water turbines 120 to achieve a lower water level 31 inside the water reservoir 125. The computerized controller 130 may be used to continuously monitor the conditions of the electrical power grid or other sources of fluctuating electricity and receive signals therefrom. When the appropriate signal is received or the excess in electrical power is detected as subsiding, the computerized controller 130 may stop the operation of some or all of the water turbines 120 in the water pumping mode. The water turbines 120 may also be slowed down or stopped as the water in the water reservoir 125 reaches the minimum level.

Once the computerized controller 130 receives the appropriate signal or detects that the power balance at the electrical power grid is stabilized (for example by detecting that the electrical energy levels are above the predetermined peak demand threshold and below the predetermined peak supply threshold), it may be configured to stop all water pumping, close all sluices, and operate the circular dam of the invention in a simple water storing mode for subsequent generating of electrical energy when the need for electrical energy is identified. In other embodiments, if there is an expectation of further spikes appearing in the supply of electricity, the computerized controller 130 may initiate partial drainage or complete drainage of water into the water reservoir 125 in the energy generating mode if it is desirable to supplement the electrical power grid with the electrical energy generated by the circular dam 100.

The energy generating mode is aimed to produce electrical energy by electrical motors/generators when the water turbines 120 are driven to rotate by water draining from the abundant body of water 10 into the water reservoir 125. High demand for electrical power may be predictable and repeatable such as electricity consumption by air conditioning systems connected to the power grid during hot summer months. In this case, the computerized controller 130 may be configured to operate the circular dam 100 in the energy-generating mode based on a certain time schedule. In other cases, such a spike in demand may not be predictable. In these cases, the computerized controller 130 may initiate the operation of the circular dam 100 in the energy generating mode upon receiving a corresponding request, such as a second signal from the electrical power grid or upon detection of electrical energy in the electrical power grid falling below a predetermined peak demand threshold. The predetermined peak demand threshold may be lower than the predetermined peak supply threshold when characterizing and monitoring the electrical power grid or receiving appropriate signals.

The energy generating mode may be characterized by opening the respective sluices to cause one, two, or more turbines 120 as appropriate to rotate based on the water level difference between the water level 30 outside the wall 110 and the water level 31 in the water reservoir 125. The computerized controller 130 may be configured to optimize the number of operating water turbines 120 depending on the demand for electrical power from the electrical power grid and the water level 31 available in the water reservoir 125, as not all water turbines 120 may be operated at all times. All electrical power generated by the motors/generators of the water turbines 120 may be directed to supplement the electrical power in the electrical power grid and satisfy an increased demand for electrical power. Generation of electrical power may continue until either the water level 31 approaches the water level 30 or until the conditions in the electrical power grid are changed and the electrical energy from the circular dam 100 is no longer required.

The circular dam 100 may also be operated as a tidal wave basin electrical generator by allowing water to passively leave the water reservoir 125 at low tides and draining the water back into the water reservoir 125 during high tides to operate the water turbines 120 in the energy generation mode.

In addition to providing supplemental electrical energy to reduce fluctuations of demand and supply for the electrical power grid, the electrical energy developed by the present invention may be directed to other useful local purposes, for example, to energize a local desalinization plant, which may be located within the boundaries of the wall 110 or somewhere else nearby. The generation of fresh potable water may be used to send the water via a suitable pipeline to feed the local area residents with high-quality freshwater. This alternative use of electrical energy generated by the circular dam 100 may be activated when excessive electrical energy consistently exceeds the supply needs, and too much water is pumped out of the water reservoir 125. Another alternative use of excess electrical energy may include generating hydrogen from the water draining into the water reservoir 125. Hydrogen produced in a nearby plant may be used to power automobiles or for other useful purposes.

Figure 6:
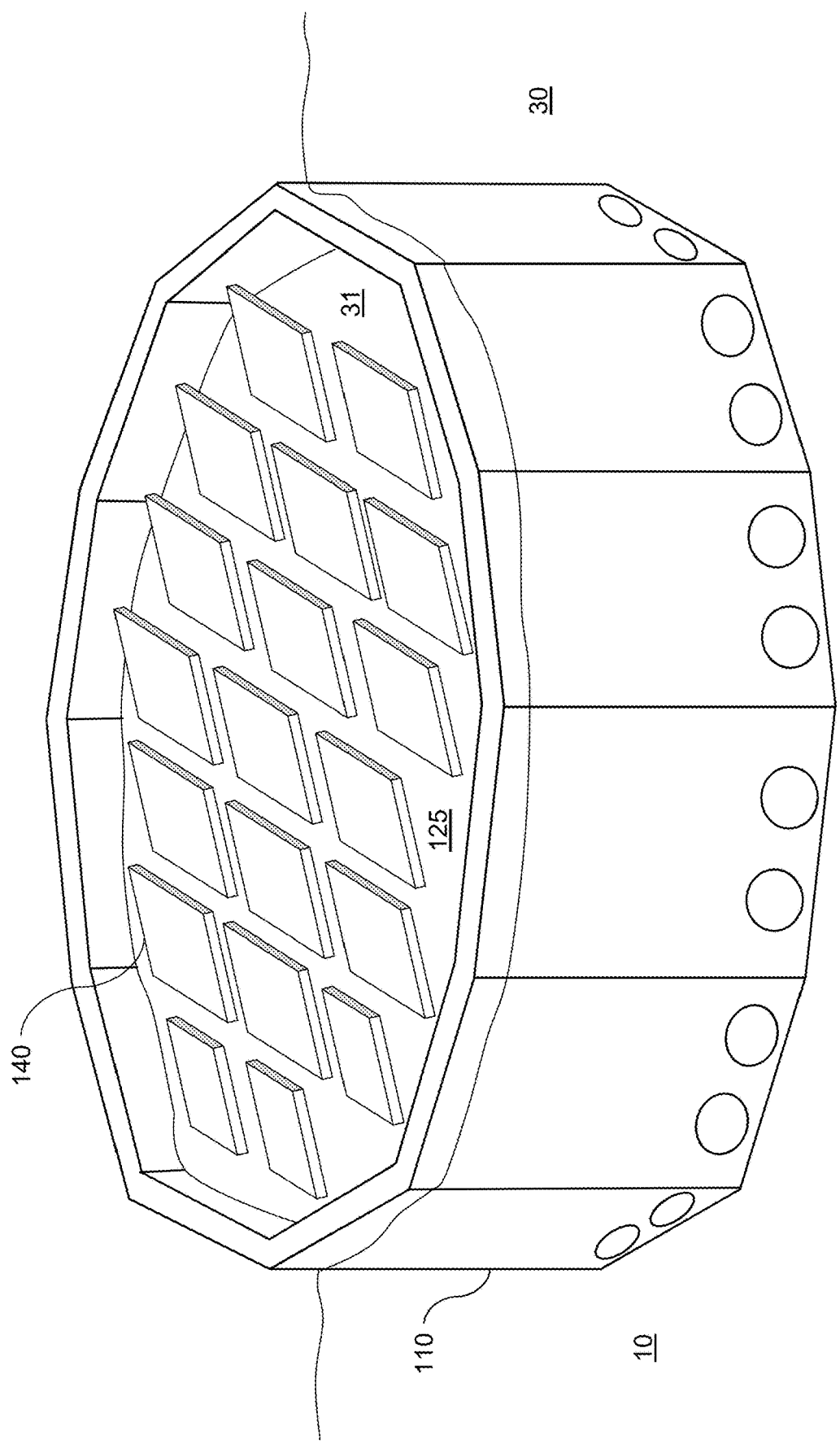
FIG. 6 is a general perspective view of a plurality of solar panels floating on top of the water within the wall of the circular dam.

FIG. 6 shows a further embodiment of the present invention aimed at using the top water surface inside the water reservoir 125 as a basis for floating solar panels in order to generate additional electrical power independent of the excessive power which may or may not be available from the electrical power grid. As the area of the water inside the water reservoir 125 is expected to be substantial, and the water inside the reservoir is not subject to high and low tides or waves and other ocean disturbances, it may offer an advantageous flat surface to locate one or more floating solar panels 140.

Any suitable design of a solar panel may be used for the purposes of the invention. The solar panels 140 may be mounted on floating bases and arranged to cover as much of the area inside the water reservoir 125 as desired. The panels may be inclined at a consistent angle selected to maximize solar exposure in a given area. In other embodiments, the solar panels may be adjusted throughout the day to maximize solar exposure even further.

A system of flexible cables may be used to electrically connect individual solar panels 140. Since the water level 31 is expected to fluctuate between the minimum level and the maximum level, the cables may be selected to accommodate the level change for at least some or all of the solar panels 140 not only in between these water levels but also in a broader range to further increase the safety of their operation, such as from the bottom of the water reservoir to the top of the wall 110. This may be done to avoid damage to the solar panels 140 in case the water level accidentally goes outside its designed and predicted limits and provide uninterrupted electrical connections for one or more solar panels regardless of water levels.

As with other solar panel systems, the generation of electrical power may not be entirely consistent and predictable when using solar panels 140. The computerized controller 130 may be configured to use the generated electrical power from the solar panels 140 according to the following priorities:

when operating in energy generating mode, direct some or all supplemental electrical power from the solar panels 140 to supplement the electrical power of the water turbines 120 and supply the electrical power grid with maximized electrical power;

as the demand for electrical power subsides, continue to direct all electrical power from solar panels 140 toward the electrical power grid, reduce the use of water turbines 120 to conserve drained water, and preserve the water level inside the reservoir 125 to be as low as possible;

as demand for electricity falls further, direct only the electrical energy from the solar panels 140 and stop pumping water from the water reservoir 125;

in stable power conditions, direct electrical power from solar panels 140 either toward the grid or to operate the water turbines 120 in the water pumping mode, depending on the level of water in the water reservoir 125 as well as on anticipated daily or weekly fluctuation in electrical power demand, if any;

when excess electrical power is available, first use electrical power from the solar panels 140 and then use excess electrical power from the electrical power grid to operate the water turbines 120 in the water pumping mode and lower the level of water in the water reservoir 125;

if the water level is low and there is still no demand for electrical power from the electrical power grid, operate the local desalinization plant or the hydrogen production plant to use electrical power from the solar panels 140.

Other operational principles may be used depending on local conditions and objectives for the circular dam 100 of the present invention.

One further source of energy in locations with high and low tides is a wave energy converter. If the wind speed exceeds the speed of a water wave, more energy is transformed into wave energy. Capturing this energy for the purposes of pumping more water into the reservoir or directly producing electricity may be done using one of several approaches utilized by various wave energy converters, namely via point absorber buoys, surface attenuators, oscillating water columns, or overtopping devices. In addition, wave concentrators may be used in the shape of long floating arms extended at an angle outward of the reservoir wall 110 and designed to reflect and concentrate ocean waves from a broad area around the wall towards one or more specific wave energy concentrators that may be attached to or incorporated with the water reservoir wall 110.

In a broad sense, the water reservoir system of the present invention has a number of important advantages as follows:
 provides a consistent output of electrical energy
 provides a missing component to enable broad use of renewable energy sources
 simple to build, operate, and maintain
 provides independent operation for water pumping out of the water reservoir and electricity generation by the water draining into thereof
 safe in operation
 can be built practically anywhere along the shoreline, does not need special natural conditions
 can be operated as a stand-alone renewable source of electricity or as a part of a broader electrical power grid.

The present invention will therefore support increased integration of renewable electric power (mostly solar and wind) and will enable the provision of additional ancillary services to the electric grid that will increase in value as more renewable sources of electricity generation become deployed and connected to the existing electrical power grid.

Importantly, there is no need for large-scale use of batteries for storing excess electrical energy, which are expensive, have poor storage and release efficiency, and have significant environmental risks if damaged.

In addition, by smoothing out peaks and valleys of energy consumption, the system of the invention would provide an instant economic benefit, since an output of consistent electrical power supply can be offered at a higher price than excessive peaks and valleys of electrical power production that can be purchased for the input to the system of the present invention at much lower prices.

EXAMPLES

FIG. 7 shows examples of various radiuses for the circular dam of the invention using calculations based on the guidelines and online calculators released by the US Dept. of Energy, known as an "Earthshot" for energy storage targeting a 90% cost reduction in grid-scale, long-duration storage (10+ hours of supply) by the end of the decade (https://www.energy.gov/eere/long-duration-storage-shot). Globally, the most ambitious known cost target (LCOS) is $0.05 per kWh targeted to be reached before 2030. Estimates of FIG. 7 show that that cost can be achieved by the present invention when a sufficiently large size is created, such as with a radius of at least 3 km).

It is contemplated that any embodiment discussed in this specification can be implemented with respect to any method of the invention, and vice versa. It will be also understood that particular embodiments described herein are shown by way of illustration and not as limitations of the invention. The principal features of this invention can be employed in various embodiments without departing from the scope of the invention. Those skilled in the art will recognize, or be able to ascertain, using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference. Incorporation by reference is limited such that no subject matter is incorporated that is contrary to the explicit disclosure herein, no claims included in the documents are incorporated by reference herein, and any definitions provided in the documents are not incorporated by reference herein unless expressly included herein.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if the order is important in a particular context, also BA, CA, CB, CBA, BCA, ACB, BAC, or CAB. Continuing with this example, expressly included are combinations that contain repeats of one or more items or terms, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12, 15, 20 or 25%.

All of the devices and/or methods disclosed and claimed herein can be made and executed without undue experimentation in light of the present disclosure. While the devices and methods of this invention have been described in terms of preferred embodiments, it will be apparent to those of skill in the art that variations may be applied to the devices and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

What is claimed is:

1. A circular dam for accumulating, storing, and releasing electrical energy, the circular dam comprising:
   a continuous wall defining a water reservoir within thereof, the wall is built in an abundant body of water and extending from a bottom thereof to or above a water level of the abundant body of water, wherein a bottom of the water reservoir remains open, the water reservoir has a diameter or width at or above 2 km, the wall is configured to contain water within the water reservoir at a water level below the water level of the abundant body of water, and wherein the water reservoir is located where the bottom of the abundant body of water contains a layer of sandy sediment with sand grains not exceeding 2 mm in size,
   a plurality of reversible water turbines operably associated with electrical motors/generators, the water turbines are configured to direct water between the water reservoir and the abundant body of water outside thereof, the water turbines are further configured to operate in an energy generating mode or a water pumping mode, wherein
      the energy generating mode is aimed to produce electrical energy by electrical motors/generators when the water turbines are driven to rotate by water draining therethrough from the abundant body of water into the water reservoir, and
      the water pumping mode is aimed to pump water from the water reservoir to the abundant body of water when the water turbines are driven by electrical motors/generators powered by excess electrical energy supplied thereto, and
   a computerized controller connected to electrical motors/generators and to an electrical power grid and configured to cause:
      accumulating energy by emptying the water reservoir using excess electrical energy from the electrical power grid to operate electrical motors/generators of the water turbines, or
      releasing energy by draining the water from the abundant body of water into the water reservoir to cause electrical motors/generators to generate electrical energy when rotated by water turbines and supply thereof to the electrical power grid,
      thereby reducing fluctuations in peak electrical energy supply and peak electrical energy demand of the electrical power grid.

2. The circular dam as in claim 1, wherein the height of the wall is not exceeding a safety margin above the water level of the abundant body of water sufficient to prevent overflowing of water from the abundant body of water into the water reservoir.

3. The circular dam as in claim 2, wherein the height of the wall is not exceeding 3 meters above the water level of the abundant body of water.

4. The circular dam as in claim 1, wherein at least one, some, or every water turbine is equipped with one or more sluices configured to control water flow across thereof.

5. The circular dam as in claim 1, wherein the abundant body or water is a lake, a sea, or an ocean.

6. The circular dam as in claim 1, wherein the computerized controller is configured to initiate accumulating energy in the water pumping mode upon receiving a first signal from the electrical power grid or upon detection of electrical energy in the electrical power grid exceeding a predetermined peak supply threshold.

7. The circular dam as in claim 6, wherein the computerized controller is further configured to initiate releasing energy in the energy generating mode upon receiving a second signal from the electrical power grid or upon detection of electrical energy in the electrical power grid falling below a predetermined peak demand threshold, the predetermined peak demand threshold is lower than the predetermined peak supply threshold.

8. The circular dam as in claim 7, wherein the computerized controller is configured to initiate releasing energy in the energy generating mode upon receiving the second signal from the electrical power grid or detection of electrical energy in the electrical power grid falling below a predetermined peak demand threshold and the water level in the water reservoir is below the current water level in the abundant body of water.

9. The circular dam as in claim 7, wherein the computerized controller is further configured to store water within the water reservoir at the water level below the water level of the abundant body of water for subsequent generating of electrical energy and without either immediate accumulating or immediate releasing energy when no first or second signal is received from the electrical power grid or upon the electrical power in the electrical power grid is determined by the computerized controller to be between the predetermined peak demand threshold and the predetermined peak supply threshold.

10. The circular dam as in claim 9, wherein the computerized controller is further configured to direct the supplemental electrical energy generated by the one or more solar panels to energize electrical motors/generators and cause pumping of water out of the water reservoir when accumulating energy or upon detection of electrical energy in the electrical power grid at or exceeding the predetermined peak demand threshold and upon detection of water level in the water reservoir above the minimum water level.

11. The circular dam as in claim 9, wherein the computerized controller is further configured to direct the supplemental electrical energy generated by the one or more solar panels to supplement the electrical energy of the power grid upon detection of electrical energy in the electrical power grid below the predetermined peak supply threshold.

12. The circular dam as in claim 11, wherein the water pumps are energized only by wind power, wherein water pumping into the water reservoir by the water pumps proceeds independently of the computerized controller causing the water turbines and associated electrical motors/generators to operate in the energy-generating mode or in the energy-releasing mode.

13. The circular dam as in claim 1, wherein the computerized controller is further configured to initiate accumulating energy in the water pumping mode upon receiving the first signal from the electrical power grid or detection of electrical energy in the electrical power grid exceeding a predetermined peak supply threshold and the water level in the water reservoir is above a minimum water level.

14. The circular dam as in claim 1 further comprising one or more solar panels electrically connected to electrical motors/generators of water turbines and to the computerized controller, the one or more solar panels are further configured to float on water within the water reservoir and generate supplemental electrical energy.

15. The circular dam as in claim 14, wherein the electrical cables connecting the one or more floating solar panels to the electrical motors/generators and to the computerized controller are further configured to provide uninterrupted electrical connections for the one or more solar panels at various water levels in the water reservoir ranging from minimum water level to maximum water level, thereby providing uninterrupted electrical connections regardless of the water level within the water reservoir.

16. The circular dam as in claim 1, wherein the computerized controller is equipped to monitor the water level in the water reservoir and the water level of the abundant body of water, wherein the computerized controller is further configured to allow water to passively flow from the water reservoir into the abundant body of water upon detecting the water level inside the water reservoir exceeding the water level outside thereof, thereby operating the circular dam as a tidal wave basin electrical generator.

17. A method of reducing peak electrical energy supply and peak electrical energy demand for an electrical power grid, the method comprising the following steps:
   a. providing a circular dam comprising a continuous wall defining a water reservoir within thereof, the wall is built in an abundant body of water and extending from a bottom thereof to or above a water level of the abundant body of water, wherein a bottom of the water reservoir remains open, the water reservoir has a diameter or width at or above 2 km, the wall is configured to contain water within the water reservoir at a water level below the water level of the abundant body of water, the circular dam further comprising a plurality of reversible water turbines operably associated with electrical motors/generators, the water turbines are located under the water level of the abundant body of water and configured to direct water across the wall between the water reservoir and the abundant body of water outside thereof, the water reservoir is located where the bottom of the abundant body of water contains a layer of sandy sediment with sand grains not exceeding 2 mm in size,
   b. operating the circular dam to accumulate energy by pumping the water from the water reservoir across the wall to the abundant body of water using excess electrical energy during peak electrical energy supply of the electrical power grid to operate electrical motors/generators of the water turbines, or
   c. operating the circular dam to release electrical energy during peak energy demand of the electrical power grid by draining the water from the abundant body of water into the water reservoir to cause electrical motors/generators to generate electrical energy and supply thereof to the electrical power grid.

* * * * *